United States Patent [19]
Cloyd et al.

[11] Patent Number: 5,918,466
[45] Date of Patent: Jul. 6, 1999

[54] COAL FUEL GAS TURBINE SYSTEM

[75] Inventors: Scott Thorsten Cloyd, Geneva; Brian Joseph Bohinsky, Oviedo; Hubertus Edward Paprotna, Orlando, all of Fla.

[73] Assignee: Siemens Westinghouse Power Corporation, Orlando, Fla.

[21] Appl. No.: 08/807,353

[22] Filed: Feb. 27, 1997

[51] Int. Cl.$^6$ ...................................................... F02C 3/16
[52] U.S. Cl. ...................... 60/735; 60/39.12; 60/39.75; 60/39.464; 60/39.182; 60/39.02
[58] Field of Search ................... 60/39.12, 39.75, 60/39.464, 39.182, 735, 39.02

[56] References Cited

U.S. PATENT DOCUMENTS

| | | | |
|---|---|---|---|
| 2,463,851 | 3/1949 | Browne | 60/41 |
| 2,970,807 | 2/1961 | Endres | 253/39.15 |
| 4,845,940 | 7/1989 | Beer | 60/732 |
| 5,388,395 | 2/1995 | Schrapf et al. | 60/39.02 |
| 5,392,595 | 2/1995 | Glickstein et al. | 60/39.02 |
| 5,469,699 | 11/1995 | Daman | 60/39.02 |
| 5,509,264 | 4/1996 | Ito et al. | 60/39.12 |

OTHER PUBLICATIONS

Newby, et al., *Advanced Hot Gas Cleaning System For Coal Gasification Processes*, May, 1993.
Jensen, et al., *Development of a Direct Coal–Fired Advanced Combined Cycle Concept for Repowering and New Base Load Generation*, Oct., 1992.
Donald L. Bonk, *Proceedings of the Coal–Fired Power Systems 93—Advances in IGCC and PFBC Review Meeting*, Jun., 1993, pp. 86–102.

*Primary Examiner*—Timothy S. Thorpe
*Assistant Examiner*—Ehud Gartenberg

[57] ABSTRACT

A gas turbine system in which substantially all of the compressed air from the compressor portion of the gas turbine is used to fluidize a bed of solid fuel, such as char, in a pressurized fluidized bed gasifier so as to produce a hot gas. The hot gas flows through a heat recovery steam generator so as to produce steam, which is expanded in a steam turbine so as to produce shaft power. A first portion of the hot gas from the heat recovery steam generator is expanded in the turbine section of the gas turbine so as to produce additional shaft power. A second portion of the hot gas from the heat recovery steam generator is then used to cool the turbine section of the gas turbine, after further cooling and filtering. Since none of the turbine cooling fluid is obtained by bleeding compressed air directly from the compressor, the mass flow of the hot gas flowing through the gasifier, and, therefore, the hot gas it produces is maximized, thereby maximizing steam generation in the heat recovery steam generator.

15 Claims, 1 Drawing Sheet

COAL FUEL GAS TURBINE SYSTEM

BACKGROUND OF THE INVENTION

The present invention relates to a gas turbine system utilizing coal fuel. More specifically, the present invention relates to a coal fuel gas turbine system in which the amount of compressed air directed to the gasifier is maximized by using the hot gas from the gasifier, after cooling, to cool the turbine section of the gas turbine.

The high efficiency, low capital cost and short lead time of gas turbine based power plants make them particularly attractive to electric utilities as a means of producing electrical power. Unfortunately, traditionally, gas turbines have been limited to operation on expensive, sometimes scarce, fuels—chiefly, distillate oil and natural gas. As a result of the ready availability and low cost of coal, considerable effort has been expended toward developing a gas turbine system for generating electrical power that can utilize coal as its primary fuel.

In one approach, referred to as an integrated combined gasification power plant, a portion of the compressed air from the gas turbine compressor is used to fluidize coal in a pressurized coal fluidized bed ("PCFB") gasifier so as to produce a hot, low to medium heating value gas. This hot gas is used to generate steam in a heat recovery steam generator ("HRSG"). The steam is then expanded in a steam turbine, thereby producing shaft power.

The gas discharged from the HRSG is then expanded in a turbine, thereby producing additional shaft power. In order to realize maximum power output during expansion in the turbine, the gas exiting the HRSG can be further heated in a topping combustor prior to expansion in the turbine.

Since the components of the turbine section are exposed to the hot gas from the topping combustor, they must be adequately cooled so that their temperature is maintained within allowable limits. Traditionally, this cooling is achieved by flowing relatively cool air over or within the turbine components. Since such cooling air must be pressurized to be effective, it is common practice to bleed a portion of the compressed air flowing through, or discharging from, the compressor section and divert it to the turbine components for cooling purposes. The cooling air typically enters the cylinder enclosing the turbine and flows through one or more rows of stationary vanes and thence into the cavity between the turbine discs disposed on either side of the vanes in that particular row. Generally, the air is extracted from several stages within the compressor section, the air from each compressor stage being directed to a different stage of the turbine, with the higher pressure air from the compressor going to the higher pressure stages in the turbine and lower pressure air used to cool lower pressure turbine stages. Additional compressed air is used to cool the turbine rotor, for example, by flowing cooling air through small passages formed in the rotating blades.

Unfortunately, this turbine cooling approach robs compressed air from the gasifier and, therefor, reduces the gas mass flow through the HRSG. The reduced gas mass flow through HRSG reduces the steam generation and, therefore, the power output from the steam turbine.

Accordingly, it would be desirable to provide a coal fuel gas turbine system that maximized the compressed air directed to the gasifier.

SUMMARY OF THE INVENTION

Accordingly, it is the general object of the current invention to provide a coal fuel gas turbine system that maximized the compressed air directed to the gasifier.

Briefly, this object, as well as other objects of the current invention, is accomplished in a method of generating power from a solid fuel, comprising the steps of (i) compressing an oxygen bearing gas, (ii) gasifying the solid fuel in at least a portion of the compressed oxygen bearing gas so as to produce a hot gas, (iii) directing a first portion of the hot gas to a first turbine for expansion therein, thereby producing shaft power and transferring heat to the turbine, (iv) cooling a second portion of the hot gas so as to produce a cooled gas, and (v) directing the cooled gas to the turbine and transferring a portion of the heat previously transferred to the turbine to the cooled gas, thereby cooling the turbine.

In a preferred embodiment of the method, the step of gasifying the solid fuel comprises the step of fluidizing the solid fuel in the oxygen bearing gas and the step of cooling the second portion of the hot gas comprises transferring heat from the second portion of the hot gas to feed water so as to generate steam that is then expanded in a steam turbine.

The invention also encompasses a gas turbine system for generating power from a solid fuel, comprising (i) a compressor for producing a flow of pressurized oxygen bearing gas, (ii) a pressurized fluidized bed gasifier for burning the solid fuel in at least a portion of the compressed oxygen bearing gas so as to produce a hot gas, (iii) a first turbine for expanding a first portion of the hot gas, thereby producing shaft power and transferring heat to the turbine, (iv) means for cooling a second portion of the hot gas so as to produce a cooled gas, and (v) means for cooling the turbine by transferring a portion of the heat previously transferred to the turbine to the cooled gas.

DESCRIPTION OF THE PREFERRED EMBODIMENT

Figure 1:
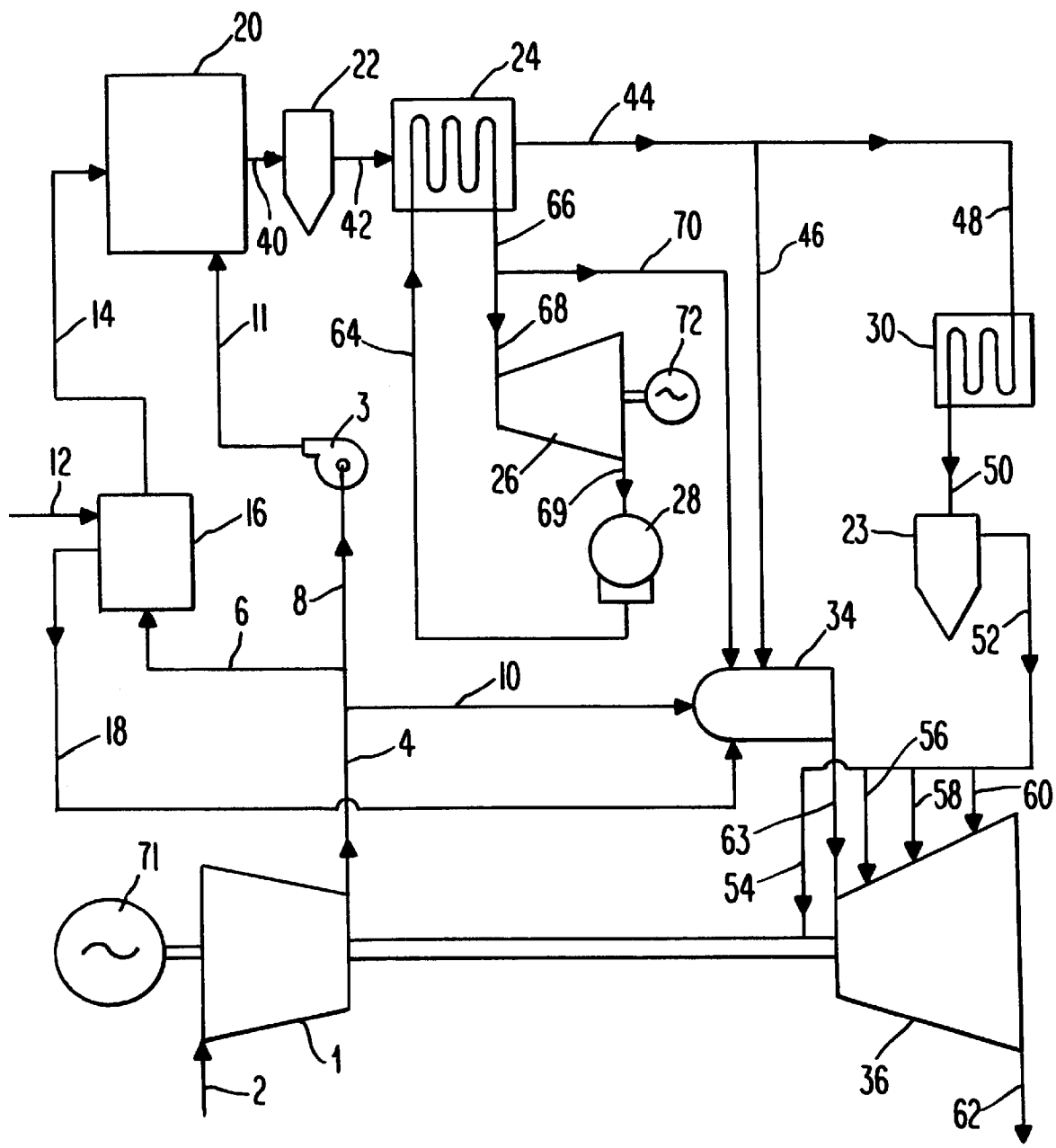
FIG. 1 is a schematic diagram of the coal fuel gas turbine system of the current invention.

Referring to the drawings, there is shown in FIG. 1 a schematic diagram of an integrated coal gasification gas turbine power plant according to the current invention. The plant comprises a compressor 1, a turbine 36, a carbonizer 16, a PCFB gasifier 20, a hot gas cleanup system 22, a HRSG 24, a steam turbine 26, a condenser 28, a topping combustor 34, a heat exchanger 30, a filter 23 and two electrical generators 71 and 72.

In operation, the compressor 1 inducts ambient air 2 and produces compressed air 4. As is conventional, the compressor may be of the axial flow type and employ alternating rows of rotating blades and stationary vanes. The compressed air 4, which in the preferred embodiment is at a temperature in the range of approximately 370–425° C. (700–800° F.) and a pressure of approximately 1600–2100 kPa (230–300 psia), is divided into three streams 6, 8, 10. The first stream 6 is directed to a carbonizer 16. The carbonizer 16 is also supplied with coal 12. Using techniques well known in the art (i.e., a pyrolysis process), the carbonizer 16 converts the coal 12 to a low BTU gas 18 and a solid, carbonaceous char 14. The low BTU gas 18 is burned in the topping combustor 34, as discussed below, and the char 14 is gasified in a PCFB gasifier 20.

The second compressed air stream 8, which constitutes the major portion of the compressed air 4, is directed to a boost compressor 3 in which the pressure of the air is raised sufficiently (e.g., approximately a 140–200 kPa (20–30 psi) pressure rise) so that, after subsequent pressure drops are accounted for, there will still be adequate pressure to introduce cooling fluid into the turbine 36 as discussed below. The further pressurized air 11 from the boost compressor 3 is then directed to the PCFB gasifier 20.

Using techniques well known in the art, in the PCFB gasifier 20, the compress air 11 is used to fluidize a bed of the char 14 in the gasifier vessel so that the char is at least partially burned in the compressed air. The combustion in the PCFB gasifier 20 produces a hot fuel gas 40 that may have a temperature as high as 1650° C. (3000° F.) and that is laden with particulates (chiefly coal slag and ash), as well as sulfur species (chiefly hydrogen sulfide and COS), and alkali species, all of which can be harmful to the turbine components. Consequently, using techniques well known in the art, the gas 40 is passed through a gas cleanup system 22 in which a major portion of these undesirable constituents are removed.

The clean gas 42 then flows through the HRSG 24, which is supplied with pressurized feed water 64. Using techniques well known in the art, in the HRSG 24, heat is transferred from the gas 42 to the feed water 64, thereby cooling the gas and generating pressurized steam 66. The HRSG 24 may of the conventional finned tube type, in which the feed water and steam flow through the tubes and the hot gas flows over the surface of the tubes. The steam 66 discharged from the HRSG 24 is divided into two streams 68 and 70. The first stream 70 is directed to the topping combustor 34. The second stream 68, which constitutes the major portion of the steam 66, is directed to a steam turbine 26, which expands the steam and produces shaft power to drive an electrical generator 72. The expanded steam 69 discharged from the steam turbine 26 is condensed in a condenser 28, so as to form the feed water 64 supplied to the HRSG 24.

From the HRSG 24, the gas 44, which has now been cooled to approximately 650–870° C. (1200–1600° F.), is divided into two stream 46 and 48. The first stream 48 is used to cool the turbine 36, as discussed below. The second stream 46, which constitutes the major portion of the hot gas 44, is directed to a topping combustor 34. Preferably, the topping combustor 34 is a multiple annular swirl type burner, such as that disclosed in U.S. Pat. No. 4,845,940 (Beer), hereby incorporated by reference in its entirety. In the topping combustor 34, the low BTU gas 18 from the carbonizer 16 is burned in the cooled gas 46. The steam 70 from the HRSG 24 supplied to the topping combustor 34 aids in the reduction in the generation of nitrogen oxides Nox, which are considered atmospheric pollutants.

The hot gas 63 from the topping combustor 34, is then expanded in the turbine 36, thereby producing shaft power that drives the compressor 1 and a second electrical generator 71. As is conventional, the turbine 36 may be of the axial flow type and have alternating rows of stationary vanes and rotating blades. The expanded gas from the turbine 36 is exhausted to atmosphere. Alternatively, a second HRSG could be used to generate additional steam by transferring heat from the exhaust gas 62.

According to an important aspect of the current invention, the gas stream 48 from the HRSG 24 is used to cool the turbine 36. First, the gas 48 is cooled in a heat exchanger 30. The heat exchanger 30 may be of the fin-fan type, in which the gas 48 flows through finned tubes over which ambient air is directed by fans, so that heat is transferred from the gas to the atmosphere. Preferably, the gas 50 is cooled to about the same temperature as the compressed air produced by the compressor 1, for example, 370–425° C. (700–800° F.).

The cooled gas 50 from the heat exchanger 30 is then directed to a filter 23, which employs one or more filter media to remove fine particles not previously removed by the gas cleanup system 22. Since the cooling gas must flow through numerous small passages in the turbine cooling flow path, it is important that as much particulate matter as possible be removed by the filter 23, thereby ensuring that the turbine cooling passages do not become clogged.

From the filter 23 the cooling gas 52 is then distributed to the various components of the turbine 36 that are exposed to the hot gas 63 from the topping combustor 34. For example, cooling gas stream 54 may be used to cool the rotating shaft and turbine blades, and cooling gas streams 56, 58 and 60 used to cool the first, second and third rows of stationary vanes, respectively. Such cooling is accomplished by transferring heat from the turbine components to the cooling gas using techniques well known in the art in conventional compressed air cooling systems, for example, by flowing the cooling gas through numerous small passages formed in the rotating blades and stationary vanes.

As shown in FIG. 1 all of the gas 48 from the HRSG 24 is directed to a single heat exchanger 30, which provides all of the turbine cooling fluid. However, the gas 48 could be divided into a number of separate streams, each of which is directed to a different heat exchanger so that the cooling gas used in different parts of the turbine could be cooled to different temperatures. Moreover, pressure reducing valves could be incorporated into the various heat exchangers so that the pressure of the the cooling gas used in different parts of the turbine could be individually regulated. Thus, for example, the highest pressure and lowest temperature cooling gas 56 could be directed to the first row of stationary vanes in the turbine 36, while lower pressure but higher temperature cooling gas 60 could be directed to the third row of stationary vanes, and an intermediate pressure and temperature cooling gas 58 could be directed to the second row of rotating vanes.

In any event, as is conventional, after flowing through the turbine cooling passages, the cooling gas is then discharged into the hot gas path of the turbine 36, thereby forming a portion of the exhaust gas 62.

Since no compressed air 4 was bled from the compressor 1 for purposes of cooling the turbine 36, the mass flow of the compressed air 8 directed to the PCFB gasifier 20, and, therefore, the mass flow of hot gas 42 supplied to the HRSG 24 has been maximized. This, in turn, maximizes the steam flow 66 generated by the HRSG 24 and, therefore, the electrical power produced in the generator 72, thereby improving the performance of the system compared to compressed air cooling systems.

The current invention has been described with reference to a particular coal fuel gas turbine system, however, the invention is also applicable to other systems as well, such as systems in which the gas from the PCFB gasifier is supplied directly to the turbine for expansion, without cooling in a HRSG or reheating in a topping combustor. Therefore, it should be understood that the present invention may be embodied in other specific forms without departing from the spirit or essential attributes thereof and, accordingly, reference should be made to the appended claims, rather than to the foregoing specification, as indicating the scope of the invention.

We claim:

1. A method of generating power from a solid fuel, comprising the steps of:

a) compressing an oxygen bearing gas;

b) gasifying said solid fuel in at least a portion of said compressed oxygen bearing gas so as to produce a hot gas;

c) directing a first portion of said hot gas to a first turbine for expansion therein, thereby producing shaft power and transferring heat to said turbine;

d) cooling a second portion of said hot gas so as to produce a cooled gas; and e) directing said cooled gas to said turbine and transferring a portion of said heat previously transferred to said turbine by said hot gas to said cooled gas, thereby cooling said turbine.

2. The method according to claim 1, wherein the step of gasifying said solid fuel comprises the step of fluidizing said solid fuel in said oxygen bearing gas.

3. The method according to claim 2, wherein the step of cooling said second portion of said hot gas comprises transferring heat from said second portion of said hot gas to feed water so as to generate steam.

4. The method according to claim 3, further comprising the step of transferring heat from said first portion of said hot gas to feed water prior to said expansion thereof so as to generate additional steam.

5. The method according to claim 3, further comprising the step of expanding said steam in a second turbine so as to produce additional shaft power.

6. The method according to claim 3, wherein the step of cooling said second portion of said hot gas further comprises transferring heat from said second portion of said hot gas to ambient air.

7. The method according to claim 3, wherein said hot gas contains particulate matter, and further comprising the step of flowing at least said second portion of said hot gas through a filter so as to remove at least a portion of said particulate matter.

8. The method according to claim 7, wherein the step of flowing said second portion of said hot gas through a filter is conducted after said cooling of said hot gas.

9. The method according to claim 1, further comprising the steps of combusting a second fuel in said first portion of said hot gas prior to said expansion of in said turbine, thereby further heating said first portion of said hot gas.

10. The method according to claim 9, further comprising the step of producing said solid fuel and said second fuel by subjecting coal to a pyrolysis process.

11. The method according to claim 9, wherein the step of combusting said second fuel comprises mixing a second portion of said compressed oxygen bearing gas into said first portion of said hot gas.

12. A gas turbine system for generating power from a solid fuel, comprising:

a) a compressor for producing a flow of pressurized oxygen bearing gas;

b) means for gasifying said solid fuel in at least a portion of said compressed oxygen bearing gas so as to produce a hot gas;

c) a first turbine for expanding a first portion of said hot gas, thereby producing shaft power and transferring heat to said turbine;

d) means for cooling a second portion of said hot gas so as to produce a cooled gas; and e) means for cooling said turbine by directing said cooled gas to said turbine and transferring a portion of said heat previously transferred to said turbine by said hot gas to said cooled gas.

13. The gas turbine system according to claim 12, wherein said means for cooling said second portion of said hot gas comprises means for transferring heat from said second portion of said hot gas to feed water so as to generate steam.

14. The gas turbine system according to claim 13, further comprising a second turbine for expanding said steam so as to produce additional shaft power.

15. The gas turbine system according to claim 13, wherein said hot gas contains particulate matter, and further comprising a filter for removing at least a portion of said particulate matter.

\* \* \* \* \*

UNITED STATES PATENT AND TRADEMARK OFFICE
CERTIFICATE OF CORRRECTION

PATENT NO. : 5,918,466
DATED : July 6, 1999
INVENTOR(S) : Scott Thorsten Cloyd, et al.

It is certified that error appears in the above-identified patent and that said Letters Patent is hereby corrected as shown below:

On the title page, item [56] insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 4 | 6 | 7 | 7 | 8 | 2 | 9 | 07/87 | Archer et al. | | | |
| | | 5 | 3 | 8 | 6 | 6 | 8 | 7 | 02/95 | Frutschi | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 0 | 6 | 3 | 4 | 5 | 6 | 2 | 11/94 | EP | | | |
| | | 7 | 1 | 3 | 5 | 5 | 3 | | 11/54 | GB | | | |
| | | 5 | 6 | 6 | 8 | 6 | 8 | | 03/93 | EP | | | |
| | | | | | | | | | | | | | |

Signed and Sealed this

Sixteenth Day of November, 1999

*Attest:*

Q. TODD DICKINSON

*Attesting Officer*  *Acting Commissioner of Patents and Trademarks*